United States Patent
Kim et al.

(10) Patent No.: US 7,860,323 B2
(45) Date of Patent: Dec. 28, 2010

(54) METHOD, APPARATUS, MEDIUM, AND DISPLAY DRIVING CIRCUIT FOR IMAGE ENCODING AND DECODING

(75) Inventors: Hyeyun Kim, Seongnam-si (KR); Shihwa Lee, Seoul (KR); Sangjo Lee, Suwon-si (KR); Dohyung Kim, Hwaseong-si (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1125 days.

(21) Appl. No.: 11/529,532

(22) Filed: Sep. 29, 2006

(65) Prior Publication Data

US 2007/0076967 A1 Apr. 5, 2007

(30) Foreign Application Priority Data

Sep. 30, 2005 (KR) .................. 10-2005-0092569

(51) Int. Cl.
*G06K 9/36* (2006.01)
(52) U.S. Cl. .................. 382/232; 382/233; 382/239; 382/166
(58) Field of Classification Search .............. 382/232, 382/233, 239, 166; 348/699; 375/240.1, 375/240.08, 240.21, E7.081, E7.252
See application file for complete search history.

(56) References Cited

U.S. PATENT DOCUMENTS

| 6,754,269 | B1 * | 6/2004 | Yamaguchi et al. | 375/240.1 |
| 6,774,892 | B2 | 8/2004 | Tamura et al. | 345/204 |
| 2004/0051717 | A1 | 3/2004 | Naiki | 345/596 |

\* cited by examiner

*Primary Examiner*—Anh Hong Do
(74) *Attorney, Agent, or Firm*—Staas & Halsey LLP

(57) ABSTRACT

The disclosure describes an image encoding apparatus, method, and medium and an image decoding apparatus, method, and medium to encode and decode an original image. The disclosure also describes a display driving circuit and a method and medium using the same. The image encoding apparatus may include an encoding mode determiner that determines a first encoding mode and a second encoding mode to be encoding modes of a first pixel and a second pixel that are adjacent to each other and are included in a line, a first encoder that encodes the first pixel whose encoding mode is determined to be the first encoding mode to generate a first bitstream, and a second encoder that encodes a difference of the second pixel whose encoding mode is determined to be the second encoding mode from its reference pixel to generate a second bitstream.

36 Claims, 13 Drawing Sheets

FIG. 17A

| 3  |              | PCM에서는 6   |
|----|--------------|---------------|
| 4  |              | v6.00 : VGA   |
| 5  | Image        | PSNR          |
| 6  | H_101.raw H  | 30.184        |
| 7  | H_108.raw H  | 19.951        |
| 8  | H_53.raw H_  | 31.037        |
| 9  | H_8011.raw   | 29.315        |
| 10 | H_engine.ra  | 37.315        |
| 11 | H_Img030004  | 13.833        |
| 12 | H_Img030007  | 36.466        |
| 13 | H_Img26.raw  | 20.435        |
| 14 | H_monkey.ra  | 29.446        |
| 15 | H_N5_ff00.r  | 33.596        |
| 16 | M_041.raw M  | 35.443        |
| 17 | M_11.raw M_  | 34.558        |
| 18 | M_115.raw M  | 36.099        |
| 19 | M_12.raw M_  | 33.309        |

FIG. 17B

| 3  |              | PCM에서는 6   |
|----|--------------|---------------|
| 4  |              | v6.00 : VGA   |
| 5  | Image        | PSNR          |
| 6  | H_101.raw H  | 30.184        |
| 7  | H_108.raw H  | 19.951        |
| 8  | H_53.raw H_  | 31.037        |
| 9  | H_8011.raw   | 29.315        |
| 10 | H_engine.ra  | 37.315        |
| 11 | H_Img030004  | 13.833        |
| 12 | H_Img030007  | 36.466        |
| 13 | H_Img26.raw  | 20.435        |
| 14 | H_monkey.ra  | 29.446        |
| 15 | H_N5_ff00.r  | 33.596        |
| 16 | M_041.raw M  | 35.443        |
| 17 | M_11.raw M_  | 34.558        |
| 18 | M_115.raw M  | 36.099        |
| 19 | M_12.raw M_  | 33.309        |

METHOD, APPARATUS, MEDIUM, AND DISPLAY DRIVING CIRCUIT FOR IMAGE ENCODING AND DECODING

CROSS-REFERENCE TO RELATED APPLICATIONS

This application claims the benefit of Korean Patent Application No. 10-2005-0092569, filed on Sep. 30, 2005, in the Korean Intellectual Property Office, the disclosure of which is incorporated herein in its entirety by reference.

BACKGROUND OF THE INVENTION

1. Field of the Invention

The present invention relates to image encoding and decoding, and more particularly, to an image encoding apparatus, method, and medium and an image decoding apparatus, method, and medium for encoding and decoding an original image to achieve a required compression rate while reducing the complexity of a decoding unit, and a display driving circuit and method and medium using the same.

2. Description of the Related Art

Multimedia devices such as mobile phones, personal digital assistants (PDAs), digital cameras, and notebook computers generally use a liquid crystal display (LCD) panel or an organic electro luminescence (EL) as a display unit. The display unit receives image data from a display driving circuit including a memory and displays an image. At this time, image data to be displayed is sequentially input to and stored in the memory.

As the size of image data that can be displayed by a display unit increases and images displayed on a multimedia device come to have high resolution and multiple gradations, the size of a memory that stores the image data also tends to increase. With this tendency, the size of a display driving circuit also increases, causing the manufacturing cost of the display driving circuit to increase. To reduce the size of the memory, the image data is compressed to be stored in the memory and is decompressed to be displayed.

When a multimedia device has a quarter video graphic array (QVGA) resolution, i.e., a resolution of 320×240 or 240×320, a display driving circuit using compression technology processes one pixel per clock during encoding. However, during decoding, since a clock is not separately assigned, the display driving circuit should process pixels corresponding to a line per clock, i.e., 240 or 320 pixels, at a time. As a result, the complexity of a decoding unit increases and the hardware size and driving power of the display driving circuit also increase.

U.S. Pat. No. 6,774,892 and US Published Patent Application No. 20040051717 disclose display driving circuits.

SUMMARY OF THE INVENTION

Additional aspects, features, and/or advantages of the invention will be set forth in part in the description which follows and, in part, will be apparent from the description, or may be learned by practice of the invention.

The present invention provides an image encoding apparatus, method, and medium for encoding an original image to achieve a required compression rate while reducing the complexity of a decoding unit.

The present invention also provides an image decoding apparatus, method, and medium for decoding the encoded original image to achieve a required compression rate while reducing the complexity of a decoding unit.

The present invention also provides a display driving circuit and method and medium for using the display driving circuit to reduce hardware complexity while achieving a required compression rate by using the image encoding apparatus and method and the image decoding apparatus and method.

According to one aspect of the present invention, there is provided an image encoding apparatus including an encoding mode determiner, a first encoder, and a second encoder. The encoding mode determiner determines a first encoding mode and a second encoding mode to be encoding modes of a first pixel and a second pixel that are adjacent to each other and are included in a line. The first encoder encodes the first pixel whose encoding mode is determined to be the first encoding mode to generate a first bitstream. The second encoder encodes a difference of the second pixel whose encoding mode is determined to be the second encoding mode from its reference pixel to generate a second bitstream.

According to another aspect of the present invention, there is provided an image encoding method including determining a first encoding mode and a second encoding mode to be encoding modes of a first pixel and a second pixel that are adjacent to each other and are included in a line, encoding the first pixel whose encoding mode is determined to be the first encoding mode to generate a first bitstream, and encoding a difference of the second pixel whose encoding mode is determined to be the second encoding mode from its reference pixel to generate a second bitstream.

According to still another aspect of the present invention, there is provided an image decoding apparatus including a decoding mode determiner, a first decoder, and a second decoder. The decoding mode determiner receives a first bitstream and a second bitstream that are obtained by encoding a first pixel and a second pixel in different encoding modes and determines a decoding mode. The first decoder generates a decoded first pixel by decoding the first bitstream if the decoding mode is a first decoding mode. The second decoder generates a decoded second pixel by decoding the second bitstream using a quantization index and adds the decoding result of a reference pixel to the decoding result of the second bitstream if the decoding mode is a second decoding mode.

According to still another aspect of the present invention, there is provided an image decoding method including receiving a first bitstream and a second bitstream that are obtained by encoding a first pixel and a second pixel in different encoding modes and determining a decoding mode, generating a decoded first pixel by decoding the first bitstream if the decoding mode is a first decoding mode, and generating a decoded second pixel by decoding the second bitstream using a quantization index and adding the decoding result of a reference pixel to the decoding result of the second bitstream if the decoding mode is a second decoding mode.

According to still another aspect of the present invention, there is provided a display driving circuit including an image encoder, a main memory, a write controller, a read controller, and an image decoder. The image encoder generates a first bitstream by encoding a first pixel of a line and generates a second bitstream by encoding a difference of a second pixel adjacent to the first pixel from its reference pixel. The main memory stores a bitstream generated by the image encoding unit. The write controller controls a write operation of the bitstream generated by the image encoding unit to the main memory. The read controller controls a read operation of the bitstream stored in the main memory. The image decoder decodes the first bitstream corresponding to the first pixel and the second bitstream corresponding to the second pixel among a bitstream corresponding to one line read from the main memory under the control of the read controller in decoding modes corresponding to encoding modes to generate a decoded first pixel and a decoded second pixel.

According to yet another aspect of the present invention, there is provided a display driving method including generating a first bitstream by encoding a first pixel of a line, generating a second bitstream by encoding a difference of a second pixel adjacent to the first pixel from its reference pixel, and storing the generated bitstream in a main memory and decoding the first bitstream corresponding to the first pixel and the second bitstream corresponding to the second pixel among a bitstream corresponding to one line read from the main memory under the control of the read control unit in decoding modes corresponding to encoding modes to generate a decoded first pixel and a decoded second pixel.

According to another aspect of the present invention, there is provided an image encoding apparatus including an encoding type determiner to determine an encoding type by comparing a first encoding error, obtained by encoding an I/P pixel pair through a first pixel encoding process and then performing decoding, with a second encoding error, obtained by encoding the I/P pixel pair through a second encoding process and then performing decoding; a first pixel encoder to encode the I/P pixel pair in different encoding modes based on a determined first encoding type; and a second pixel encoder to encode the I/P pixel pair in different encoding modes based on a determined second encoding type.

According to another aspect of the present invention, there is provided an image decoding apparatus including a decoding type determiner to receive a bitstream of an I/P pixel pair and to determine a decoding type from an encoding type included in the bitstream; a first pixel decoder to decode the bitstream of the I/P pixel pair in different decoding modes based on a determined first decoding type; and a second pixel decoder to decode the bitstream of the I/P pixel pair in different decoding modes based on a determined second pixel decoding type.

According to another aspect of the present invention, there is provided an image decoding method including receiving a bitstream of an I/P pixel pair and determining a decoding type from an encoding type included in the bitstream; decoding the bitstream of the I/P pixel pair in different decoding modes based on a determined first decoding type; and decoding the bitstream of the I/P pixel pair in different decoding modes based on a determined second pixel decoding type.

According to yet another aspect of the present invention, there is provided an image encoding method including determining an encoding type by comparing a first encoding error, obtained by encoding an I/P pixel pair through a first pixel encoding process and then performing decoding, with a second encoding error, obtained by encoding the I/P pixel pair through a second encoding process and then performing decoding; encoding the I/P pixel pair in different encoding modes based on a determined first encoding type; and encoding the I/P pixel pair in different encoding modes based on a determined second encoding type.

The image encoding method, the image decoding method, and the display driving method can be embodied as computer readable code on a computer readable recording medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects, features, and advantages of the invention will become apparent and more readily appreciated from the following description of exemplary embodiments, taken in conjunction with the accompanying drawings of which:

FIGS. 17A and 17B are views for comparing the display quality of an original image having a text and the display quality of its reconstructed image according to an exemplary embodiment of the present invention.

DETAILED DESCRIPTION OF THE PREFERRED EMBODIMENTS

Figure 1:
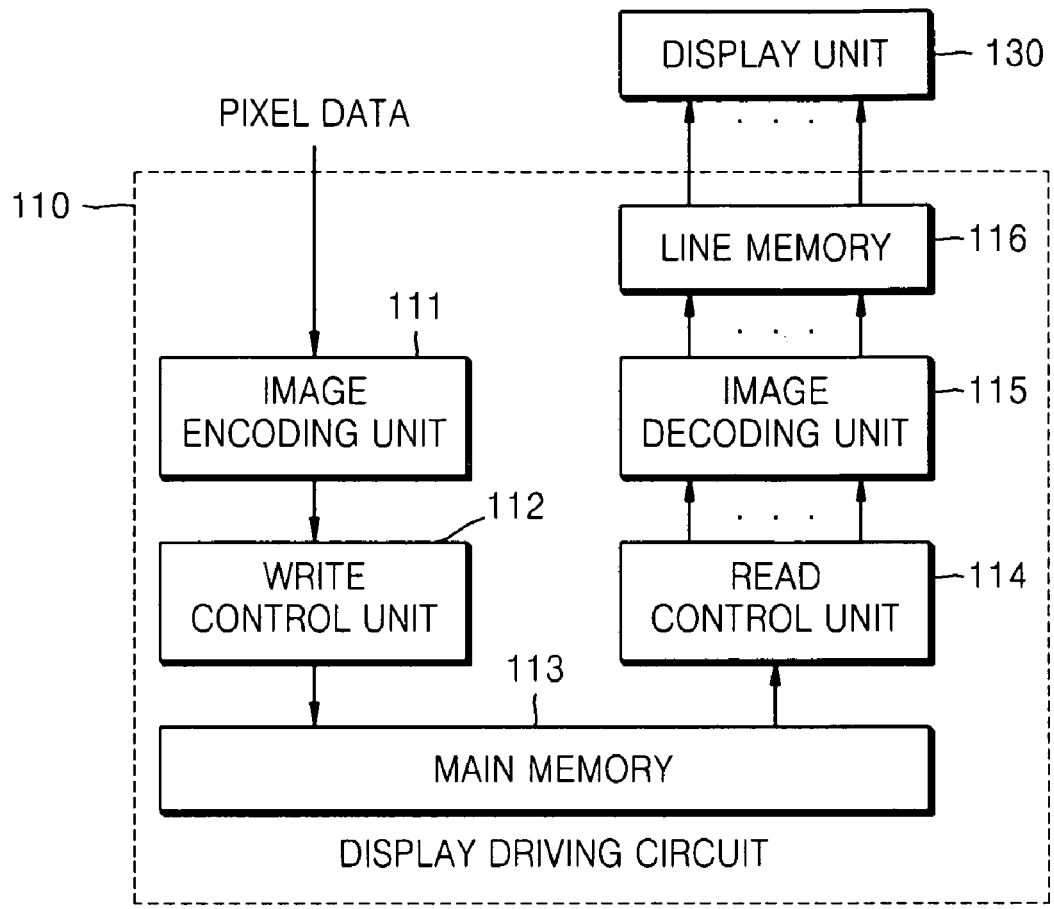
FIG. 1 is a block diagram of a display driving circuit according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram of a display driving circuit 110 according to an exemplary embodiment of the present invention. The display driving circuit 110 includes an image encoding unit 111 (image encoder), a write control unit 112 (write controller), a main memory 113, a read control unit 114 (read controller), an image decoding unit 115 (image decoder), and a line memory 116.

Referring to FIG. 1, the image encoding unit 111 sequentially receives image data to be displayed on a display unit 130 and encodes the received image data in units of N bits. Here, the N bits are predetermined according to a required compression rate. For example, if R, G, and B components of each pixel of an original image are each composed of 6 bits, a required compression rate is 75%, and encoding is performed in units of 2 pixels, the N bits are 27 bits. A bitstream generated by encoding pixels is stored in the main memory 113 under the control of the write control unit 112. At this time, the image encoding unit 111 determines one of a first encoding mode and a second encoding mode for each pixel included in a line, generates a first bitstream by encoding pixels corresponding to the first encoding mode, and generates a second bitstream by encoding a difference of pixels corresponding to the second encoding mode from their reference pixels.

The write control unit 112 controls the write operation of the bitstream generated by the image encoding unit 111 into the main memory 113. In other words, the write control unit 112 sets a write address of the main memory 113 and performs a control operation such that the generated bitstream is written at the set write address.

The main memory 113 stores the bitstream generated by the image encoding unit 111 under the control of the write control unit 112.

The read control unit 114 controls the read operation of the stored bitstream from the main memory 113. In particular, the read control unit 114 performs a control operation such that bitstreams corresponding to one line are simultaneously read from the main memory 113. In other words, the read control unit 114 sets read addresses of the main memory 113 and performs a control operation such that bitstreams are read from the set read addresses.

The image decoding unit 115 (e.g., a video decoding unit) decodes the bitstreams corresponding to one line, which are read from the main memory 113 under the control of the read control unit 114, through an inverse process to that in the image encoding unit 111, thereby reconstructing image data to be displayed on the display unit 130. The image decoding unit 115 determines one of a first decoding mode and a second decoding mode for each pixel included in a line according to an encoding mode obtained by analyzing a bitstream corresponding to each pixel included in the line, generates a decoded I pixel by decoding a bitstream corresponding to the first decoding mode, and generates a decoded P pixel by decoding a bitstream corresponding to the second decoding mode and adding the decoded bitstream to the decoded I pixel.

The line memory 116 temporarily stores image data corresponding to a line, which is reconstructed by the image decoding unit 115, and displays the image data on the display unit 130.

Figure 2:
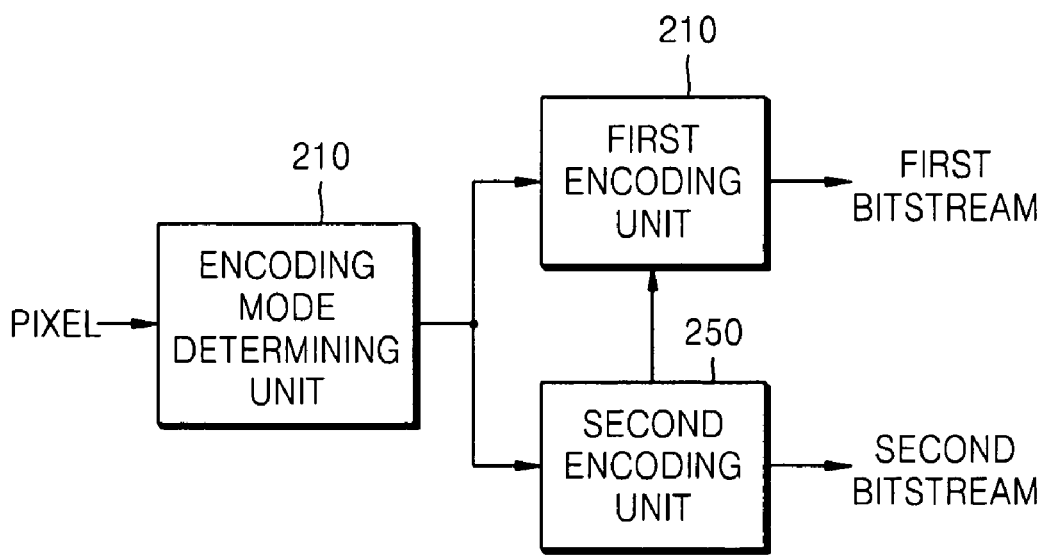
FIG. 2 is a block diagram of an image encoding unit according to an exemplary embodiment of the present invention.

FIG. 2 is a block diagram of the image encoding unit 111 according to an exemplary embodiment of the present invention. The image encoding unit 111 includes an encoding mode determining unit 210 (encoding mode determiner), a first encoding unit 230 (first encoder), and a second encoding unit 250 (second encoder).

Referring to FIG. 2, the encoding mode determining unit 210 determines an encoding mode for an input pixel. When pixels corresponding to a line are sequentially input, the encoding mode determining unit 210 determines the first encoding mode, i.e., an intra (I) mode, as the encoding mode of an odd-numbered pixel and determines the second encoding mode, i.e., a predictive (P) mode, as the encoding mode of an even-numbered pixel. For convenience of explanation, the odd-numbered pixel will be referred to as an I pixel and the even-numbered pixel will be referred to as a P pixel.

The first encoding unit 230 receives pixels whose encoding mode is determined to be the first encoding mode by the encoding mode determining unit 210, i.e., I pixels, and generates the first bitstream by encoding the I pixels. For example, when R, G, and B components of each pixel are each composed of 6 bits, i.e., each pixel is composed of 18 bits, the first encoding unit 230 performs bit-shifting on the R, G, and B components to remove the least significant bit from each of the R, G, and B components, thereby encoding the I pixel into 15 bits. The number of bits that can be removed from each of the R, G, and B components in encoding may be determined in consideration of at least one of the number of bits of the R, G, and B components of each pixel of the original image, a required compression rate, and required display quality.

The second encoding unit 250 receives pixels whose encoding mode is determined to be the second encoding mode by the encoding mode determining unit 210, i.e., P pixels, and generates the second bitstream by encoding the P pixels. The second encoding unit 250 encodes a difference between the P pixel and its adjacent I pixel determined to be a reference pixel. At this time, a quantization range used for encoding the difference is adjusted according to the range of R, G, and B components of the adjacent I pixel. To determine the reference pixel, one of the following three methods may be used. First, when bidirectional prediction is used, a first difference between the current P pixel and its previous I pixel and a second difference between the current P pixel and its next I pixel are obtained and the I pixel having the smaller difference from the current P pixel is determined to be the reference pixel. Second, when unidirectional prediction is used, the previous I pixel of the current P pixel is determined to be the reference pixel. Third, when unidirectional prediction is used, the next I pixel of the current P pixel is determined to be the reference pixel. When bidirectional prediction is used, a one-bit direction flag indicating the position of the reference pixel is included in the second bitstream. When unidirectional prediction is used, a separate direction flag is not required because the reference pixel is fixed. Here, the one-bit direction flag is assigned '0' if the reference pixel is the next I pixel of the current P pixel and '1' if the reference pixel is the previous I pixel of the current pixel P, or vice versa. In an edge region of the original image having many edge regions, the difference of a P pixel from an I pixel is large. Since it is difficult to reduce the range of the difference of the P pixel from the I pixel using unidirectional prediction, the display quality of a reconstructed image may not be good. In this case, the range of the difference of the P pixel from the I pixel is reduced by referring to an I pixel in a direction having a small difference using bidirectional prediction, thereby guaranteeing superior display quality of the reconstructed image. In other words, if the actual difference is about 50 by referring to an I pixel in a direction having a large difference and a quantization table can express a maximum difference of up to 30, a quantization error of 20 may be generated. Thus, on the assumption that a difference obtained by referring to an I pixel in a direction having a small difference is mostly within 30, a difference and a quantization index are mapped to each other in the quantization table. In other words, it is desirable to refer to an I pixel in a direction having a small difference because encoding can be performed more easily as a value to be encoded is smaller.

Figure 3:
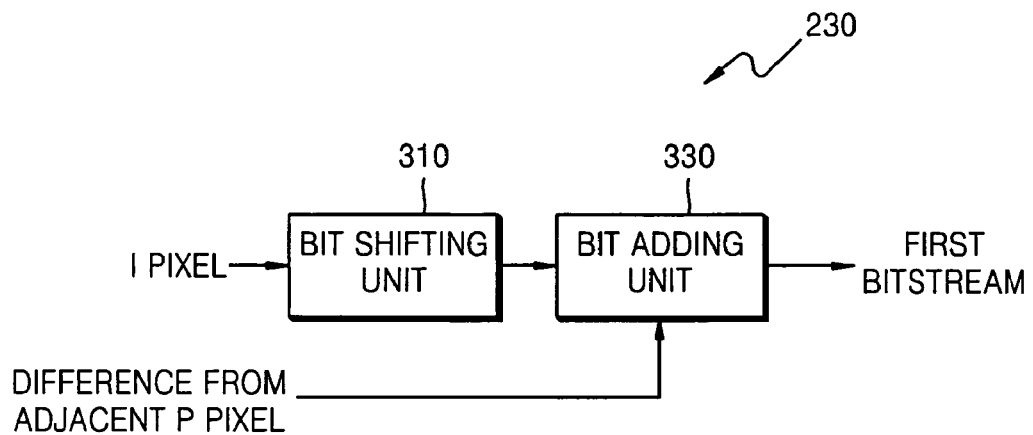
FIG. 3 is a detailed block diagram of a first encoding unit of FIG. 2.

FIG. 3 is a detailed block diagram of the first encoding unit 230 of FIG. 2. The first encoding unit 230 includes a bit shifting unit 310 (bit shifter) and a bit adding unit 330 (bit adder). Here, the bit adding unit 330 is optional.

Referring to FIG. 3, the bit shifting unit 310 removes the least significant bit from each of the R, G, and B components of an I pixel by performing bit shifting on each of the R, G, and B components of the I pixel by 1 bit, thereby encoding the I pixel.

The bit adding unit 330 adds the removed least significant bit to one of the R, G, and B components of the encoded I pixel provided from the bit shifting unit 310 according to R, G, and B differences of an adjacent P pixel determined to be a reference pixel from the I pixel.

Figure 4:
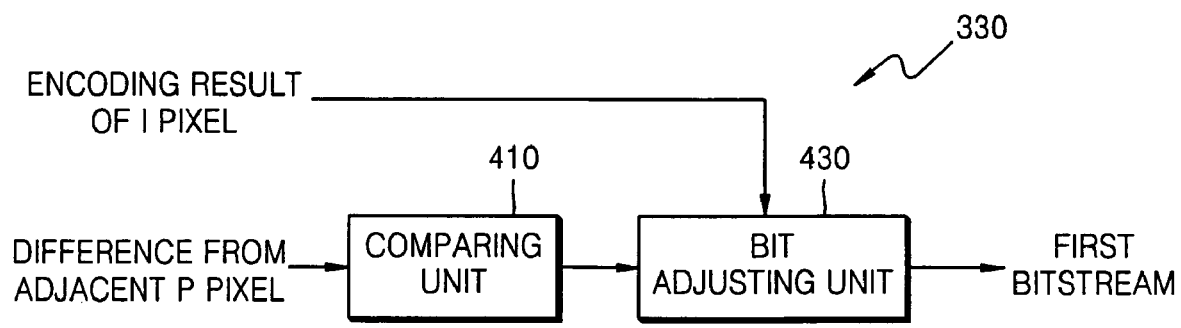
FIG. 4 is a detailed block diagram of an additional bit assigning unit of FIG. 3.

FIG. 4 is a detailed block diagram of the bit adding unit 330 of FIG. 3. The bit adding unit 330 includes a comparing unit 410 (comparator) and a bit adjusting unit 430 (bit adjuster).

Referring to FIG. 4, the comparing unit 410 receives the R, G, and B differences of the adjacent P pixel determined to be the reference pixel from the I pixel and compares the R, G, and B differences to check if the R, G, and B differences are the same as one another.

Figure 5:
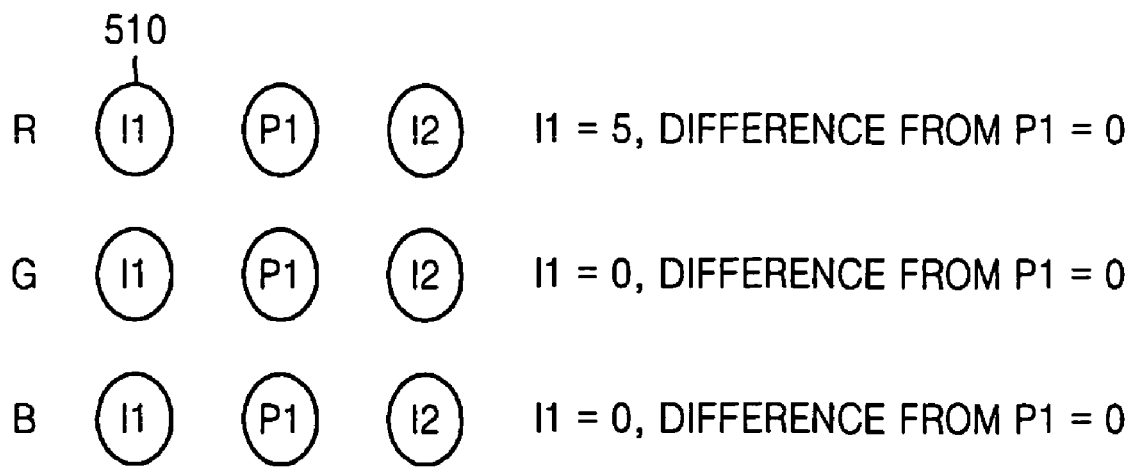
FIG. 5 is a view for explaining a process of adjusting bits of an I pixel when R, G, and B differences of an adjacent P pixel from the I pixel are the same as one another.

The bit adjusting unit 430 adjusts bits of one of the R, G, and B components of the encoded I pixel according to the comparison result of the comparing unit 410. If the R, G, and B differences of the adjacent P pixel determined to the reference pixel from the I pixel are the same as one another, the bit adjusting unit 430 checks the encoding results of the R, G, and B components of the encoded I pixel and adjusts bits of one of the R, G, and B components having an encoding result that is not 0. At this time, it is desirable to check the encoding results in the order of G, R, then B. This is because human eyes are most sensitive to G color. For example, when the R, G, and B differences of an adjacent P pixel P1 determined to be the reference pixel from the I pixel I1 are all '0' as in FIG. 5, the encoding result of a G component of an I pixel I1 is first checked. Since the encoding result of the G component is '0', an R component 510 of the I pixel I1 is checked. Since the encoding result of the R component 510 is '5', the removed least significant bit is added to the encoding result of the R component 510 to generate a final first bitstream corresponding to the I pixel. In this case, information loss of the color components can be minimized by assigning more bits to a color component of an I pixel, which has an encoding result that is not '0', than the other color components, thereby improving the display quality of a reconstructed image.

Figure 6:
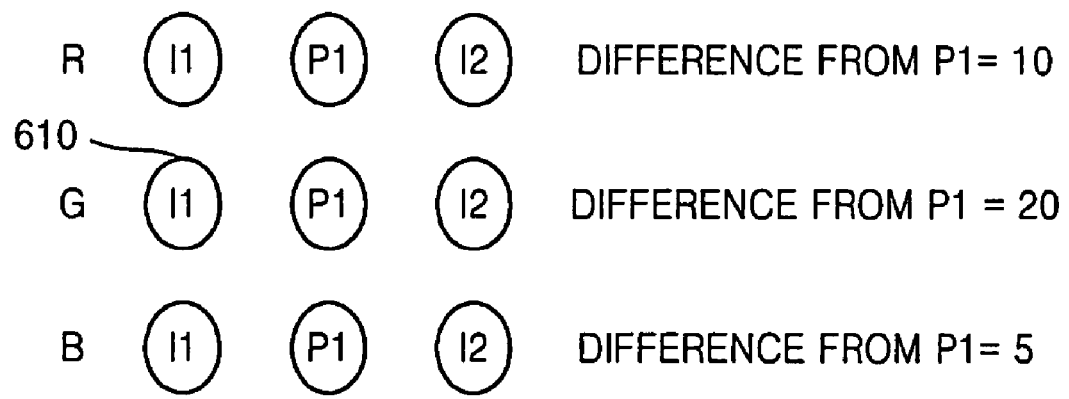
FIG. 6 is a view for explaining a process of adjusting bits of an I pixel when R, G, and B differences of an adjacent P pixel from the I pixel are different from one another.

If the R, G, and B differences of the adjacent P pixel determined to be the reference pixel from the I pixel are different from one another, the bit adjusting unit 430 adjusts bits of the encoding result of one of the R, G, and B components of an I pixel, which corresponds to the largest difference. In other words, when the R, G, and B differences of the adjacent P pixel P1 determined to be the reference pixel from the I pixel I1 are '10', '20', and '5' as in FIG. 6, the G difference is largest. Thus, the removed least significant bit is added to the encoding result of a G component 610 of the I pixel I1, thereby generating a final first bitstream corresponding to the I pixel. In this case, information loss of the color components can be minimized by assigning more bits to an encoded color component of an adjacent I pixel corresponding to a color component of a P pixel having the largest difference, i.e., a color component having the largest change, than the other color components, thereby improving the display quality of a reconstructed image.

The bit adding unit 330 may add a bit to the encoding result of the G component of the I pixel without the comparing unit 410. In other words, the bit adding unit 330 adds a bit to the encoding result of the G component that is most sensitive to human eyes regardless of the R, G, and B components of a P pixel determined to be the reference pixel.

Figure 7:
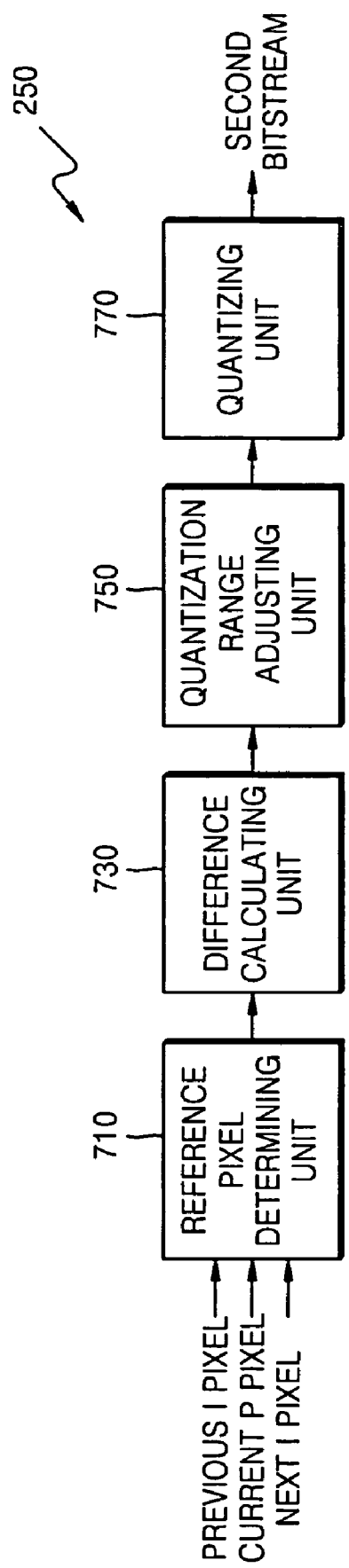
FIG. 7 is a detailed block diagram of a second encoding unit of FIG. 2.

FIG. 7 is a detailed block diagram of the second encoding unit 250 of FIG. 2. The second encoding unit 250 includes a reference pixel determining unit 710 (reference pixel determiner), a difference calculating unit 730 (difference calculator), a quantization range adjusting unit 750 (quantization range adjuster), and a quantizing unit 770 (quantizer). Here, the reference pixel determining unit 710 is optional and is included when bidirectional prediction is used. When unidirectional prediction is used, the current P pixel and its previous or next I pixel are provided to the difference calculating unit 730.

Referring to FIG. 7, the reference pixel determining unit 710 receives the current P pixel and its previous and next I pixels and calculates a first difference between the current P pixel and its previous I pixel and a second difference between the current P pixel and its next I pixel. The reference pixel determining unit 710 determines an I pixel having the smaller difference to be the reference pixel. At this time, the reference pixel determining unit 710 may determine the reference pixel using a G component of each pixel, which is most sensitive to human eyes.

The difference calculating unit 730 calculates a difference between the current P pixel and its adjacent I pixel determined to be the reference pixel.

The quantization range adjusting unit 750 adjusts a quantization range in a quantization table, which is used for quantization of the R, G, and B differences of the current P pixel from the I pixel, according to the adjacent I pixel determined to be the reference pixel. At this time, the quantization range is adjusted whenever a P pixel is encoded. Here, the quantization table has differences and quantization indices that are mapped to each other and is provided in the second encoding unit 250 and a second decoding unit 950 (second decoder) that will be described later.

The quantizing unit 770 quantizes the difference of the current P pixel from I pixel to generate a quantization index. For example, when the R, G, and B components of each pixel of the original image are each composed of 6 bits, each of the R and B differences of the current P pixel is encoded into 3 bits. At this time, if the quantization range is adjusted to a difference '0' and 6 symmetric differences, e.g., [−4, −2, −1, 1, 2, 4] in the quantization table, one of quantization indices 000 through 110 mapped to those 7 differences is assigned to each of the R and B differences. A difference that is not included in the quantization table is encoded with a quantization index mapped to its closest value. In other words, when the color components of each pixel are each composed of 6 bits, the actual difference of a P pixel from its reference pixel ranges from −63 to 63. In this case, the actual difference is mapped to its closest value in the quantization table. When such a quantization range is used, a difference of −63 is mapped to −4, resulting in a large difference between the actual difference and the mapped value. In other words, when each of the R and B differences of the P pixel is mapped to one of the 7 differences and there is a large difference between the actual difference and the mapped value, e.g., if the actual difference is −63 and the mapped value in the quantization table is −4, a quantization index '111' indicating '0' or '63' is assigned. At this time, if the I pixel determined to be the reference pixel is smaller than 16, the quantizing unit 770 determines which one of the quantization index '111' indicating '63' and a quantization index corresponding to the actual difference in the quantization table is to be used for quantization, by comparing a difference between a decoded pixel and the original pixel in case of the quantization index '111' indicating '63' with a difference between a decoded pixel and the original pixel for a quantization index corresponding to the actual difference. Thus, if a difference between the two differences is larger than a threshold, the quantization index '111' indicating '63' is used. If the I pixel determined to be the reference pixel is larger than 48, the quantizing unit 770 determines which one of the quantization index '111' indicating '0' and a quantization index corresponding to the actual difference in the quantization table is to be used for quantization, by comparing a difference between a decoded pixel and the original pixel in case of the quantization index '111' indicating '0' with a difference between a decoded pixel and the original pixel for a quantization index corresponding to the actual difference. Thus, if a difference between the two differences is larger than a threshold, the quantization index '111' indicating '0' is used for quantization.

Since the G difference of the P pixel is most sensitive to human eyes, it is encoded into 4 bits. At this time, if the quantization range is adjusted to the difference '0' and 15 differences, e.g., [−48, −32, −16, −8, −4, −2, −1, 1, 2, 4, 8, 16, 32, 48, 56], one of quantization indices 0000 through 1111 mapped to those 16 differences is assigned to the G difference.

Figure 8:
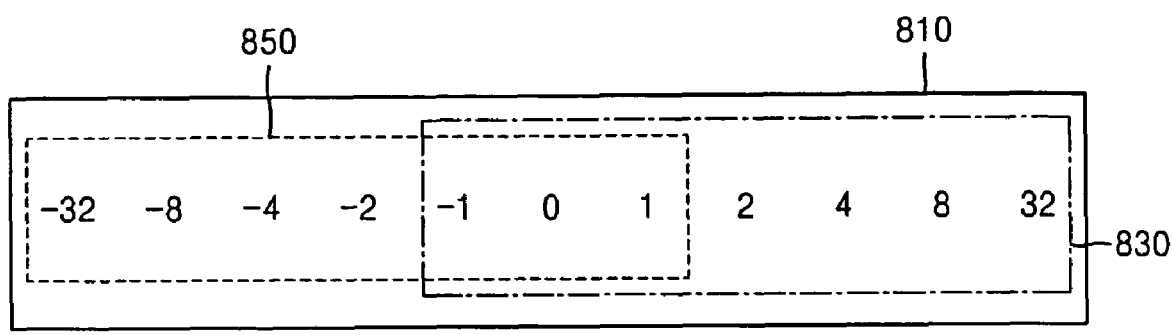
FIG. 8 is a view for explaining the operation of a quantization range adjusting unit of FIG. 7.

FIG. 8 is a view for explaining the operation of the quantization range adjusting unit 750 of FIG. 7. For example, when each of the R and B differences of the P pixel is encoded into 3 bits, the R and B components of the adjacent I pixel determined to be the reference pixel are checked. If the R and B components are smaller than a first threshold, e.g., 16, there is a high possibility that the R and B differences of the P pixel are positive numbers. Thus, a quantization range is moved by 2 values to the right in a quantization table 810, thereby obtaining a quantization range 830 having more positive numbers. On the other hand, if the R and B components are larger than a second threshold, e.g., 48, there is a high possibility that the R and B differences of the P pixel are negative numbers. Thus, a quantization range is moved by 2 values to the left in the quantization table 810, thereby obtaining a quantization range 850 having more negative numbers. For the G component of the I pixel determined to be the reference pixel, the first threshold and the second threshold may be set adaptively according to the number of bits used for encoding of the G difference of the P pixel. As such, by adjusting the quantization range adaptively according to the I pixel determined to be the reference pixel, quantization can be performed with a quantization index corresponding to a value that is closest to the actual difference and thus a quantization error can be reduced.

Figure 9:
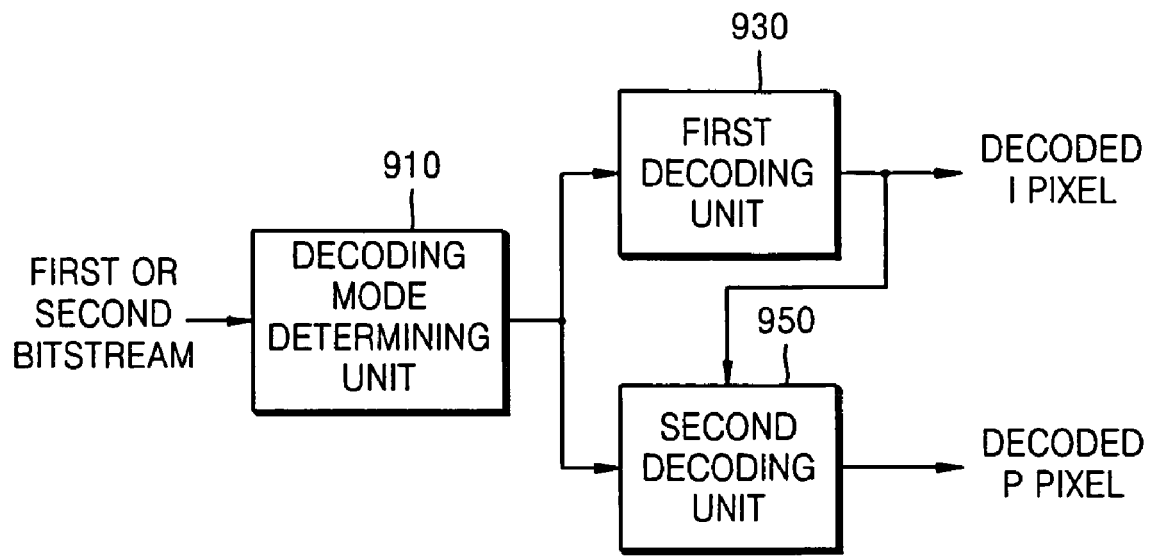
FIG. 9 is a block diagram of an image decoding apparatus according to an exemplary embodiment of the present invention.

FIG. 9 is a block diagram of an image decoding unit 115 according to an exemplary embodiment of the present invention. The image decoding apparatus includes a decoding mode determining unit 910 (decoding mode determiner), a first decoding unit 930 (first decoder), and a second decoding unit 950 (second decoder).

Referring to FIG. 9, the decoding mode determining unit 910 receives a first bitstream and a second bitstream, i.e., the first bitstream corresponding to I pixels and the second bitstream corresponding to P pixels, in units of 2 pixels, determines a first decoding mode for the first bitstream corresponding to the I pixels and provides the first bitstream to the first decoding unit 930, and determines a second decoding mode for the second bitstream corresponding to the P pixels and provides the second bitstream to the second decoding unit 950.

When the decoding mode is determined to be the first decoding mode by the decoding mode determining unit 910, the first decoding unit 930 decodes the first bitstream to generate a decoded I pixel. Decoding of the first bitstream can be performed in one of the following four ways. First, the most significant bit of each color component included in the first bitstream is copied and added as the least significant bit of each color component of the decoded I pixel. Second, the least significant bit of each color component included in the first bitstream is copied and added as the least significant bit to each color component. Third, '1' is added as the least significant bit of each color component of the decoded I pixel. Fourth, '0' is added as the least significant bit of each color component of the decoded I pixel.

When the decoding mode is determined to be the second decoding mode by the decoding mode determining unit 910, the second decoding unit 950 decodes the second bitstream through an inverse process to the second encoding unit 250 to generate a decoded P pixel.

Figure 10:
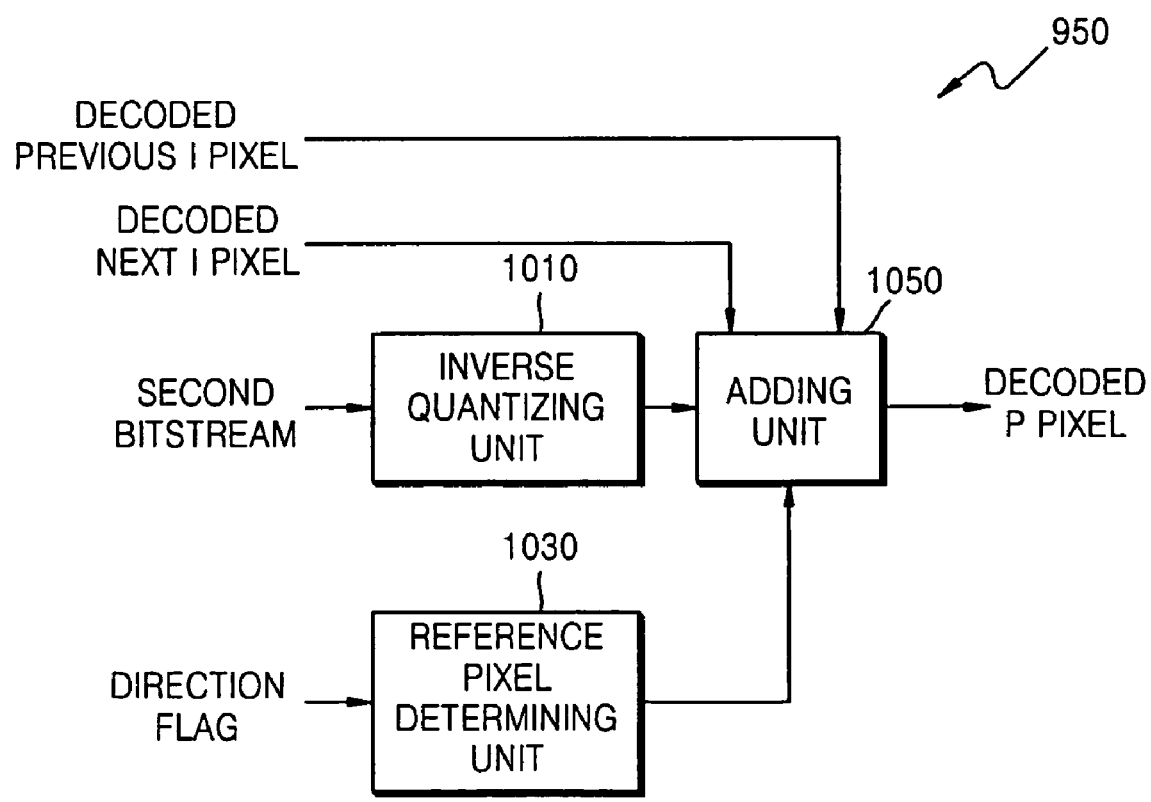
FIG. 10 is a detailed block diagram of a second decoding unit of FIG. 9.

FIG. 10 is a detailed block diagram of the second decoding unit 950 of FIG. 9. The second decoding unit 950 includes an inversely quantizing unit 1010 (inverse quantizer), a reference pixel determining unit 1030 (reference pixel determiner), and an adding unit 1050 (an adder).

Referring to FIG. 10, the inversely quantizing unit 1010 receives a data portion of the second bitstream and inversely quantizes the data portion based on the quantization table used in the second encoding unit 250. In other words, the inversely quantizing unit 1010 obtains a difference corresponding to a quantization index of each color component included in the data portion of the second bitstream from the quantization table and provides the obtained difference to the adding unit 1050.

The reference pixel determining unit 1030 determines one of a decoded previous I pixel and a decoded following I pixel to be a reference pixel of a P pixel based on a direction flag included in a header portion of the second bitstream. In bidirectional prediction, '0' or '1' is assigned as the direction flag for a P pixel. In unidirectional prediction, it is not necessary to assign the direction flag. When the direction flag is not assigned, an adjacent I pixel agreed between the second encoding unit 250 and the second decoding unit 950 is determined to be the reference pixel.

The adding unit 1050 selects one of the decoded previous I pixel and the decoded following I pixel according to determination of the reference pixel determining unit 1030 and adds each color component of the selected I pixel to each color component difference provided from the inversely quantizing unit 1010, thereby generating a decoded P pixel.

Figure 11:
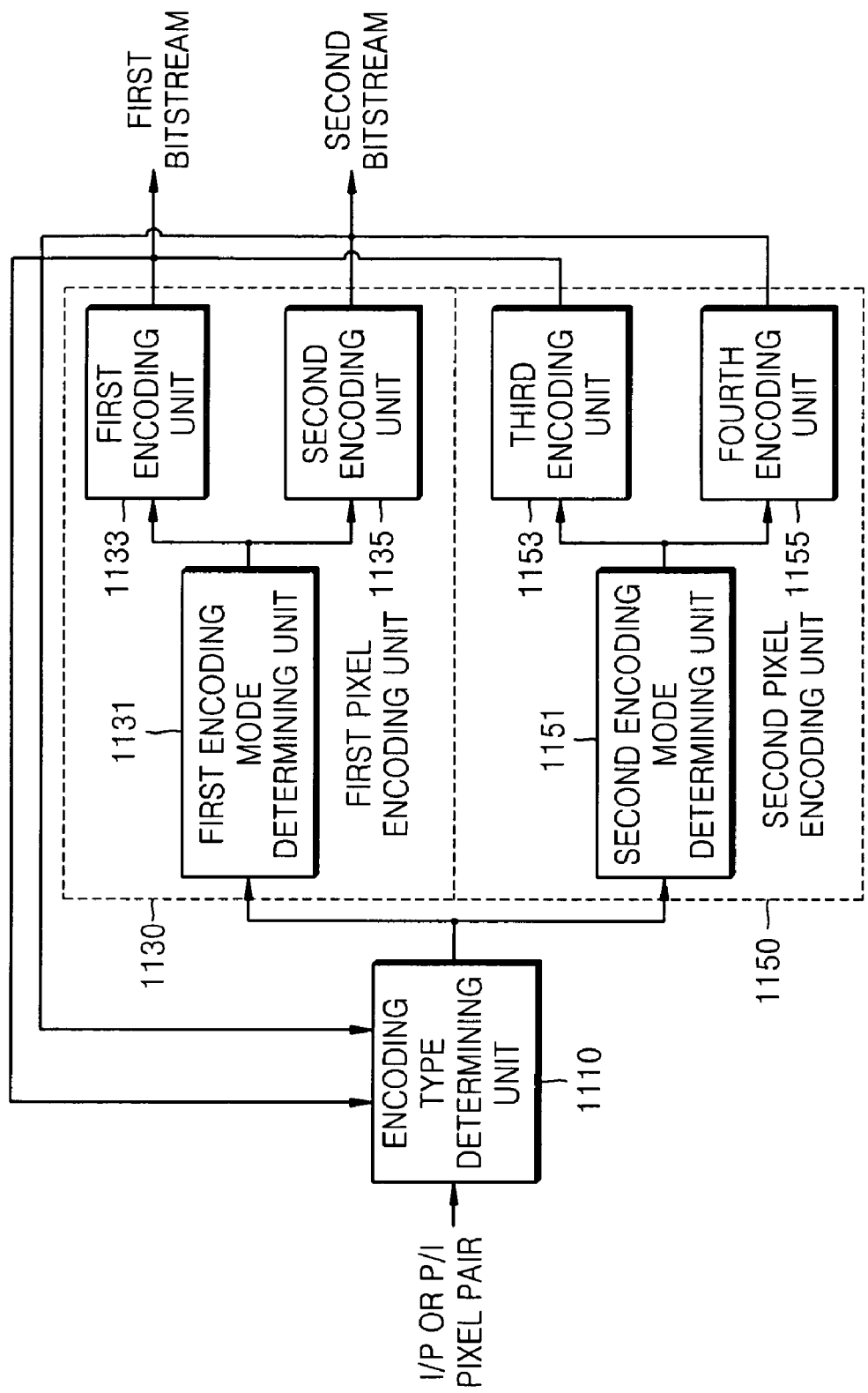
FIG. 11 is a block diagram of an image encoding apparatus according to another exemplary embodiment of the present invention.

FIG. 11 is a block diagram of an image encoding apparatus according to another exemplary embodiment of the present invention. The image encoding apparatus includes an encoding type determining unit 1110 (encoding type determiner), a first pixel encoding unit 1130 (first pixel encoder), and a second pixel encoding unit 1150 (second pixel encoder). The first pixel encoding unit 1130 includes a first encoding mode determining unit 1131 (first encoding mode determiner), a first encoding unit 1133 (first encoder), and a second encoding unit 1135 (second encoder). The second pixel encoding unit 1150 includes a second encoding mode determining unit 1151 (second encoding mode determiner), a third encoding unit 1153 (third encoder), and a fourth encoding unit 1155 (fourth encoder).

Referring to FIG. 11, the configurations and operations of the first pixel encoding unit 1130 and the second pixel encoding unit 1150 may be the same as those of FIGS. 2 through 8 or may be changed adaptively according to the forms of desired first and second bitstreams. Here, a description will be focused on a difference from the exemplary embodiment of FIG. 2.

The encoding type determining unit 1110 determines an encoding type by comparing a first encoding error obtained by encoding an I/P pixel pair (or a P/I pixel pair) by the first pixel encoding unit 1130 and then performing decoding and a second encoding error obtained by encoding the I/P pixel pair (or the P/I pixel pair) by the second pixel encoding unit 1150 and then performing decoding, and provides the I/P pixel pair (or the P/I pixel pair) to the first pixel encoding unit 1130 or the second pixel encoding unit 1150 based on the determined encoding type. In other words, encoding is performed by one of the first pixel encoding unit 1130 and the second pixel encoding unit 1150, but the total number of bits obtained by performing encoding in units of 2 pixels, i.e., encoding the I/P pixel pair (or the P/I pixel pair) should be uniform. In this case, the start and end of a bitstream can be known in units of 2 pixels in decoding, and thus both a P pixel having a large difference of a P pixel from its reference pixel and a P pixel having a small difference of a P pixel from its reference pixel can be encoded well. In other words, differences included in a quantization table, which correspond to a value to be encoded, should increase when the difference of a P pixel from its reference pixel is large, and the differences do not have to be large when the difference of the P pixel from its reference pixel is small. This is because, if the difference of a P pixel from its reference pixel ranges from −8 to 8, differences included in the quantization table do not have to be larges. However, if the difference of a P pixel from its reference pixel ranges from −63 to 63, the quantization table should include differences ranging having large values to appropriately map the differences from −63 to 63 to the differences of the quantization table.

When the color components of each of the input I/P pixel pair (or the P/I pixel pair) are each composed of 6 bits, the first pixel encoding unit 1130 encodes the R, G, and B components of the I pixel into 5, 6, and 5 bits and the R, G, and B differences of the P pixel into 3, 3, and 3 bits, thereby generating the first bitstream and the second bitstream. Here, when the R, G, and B differences of the P pixel are encoded into 3, 3, and 3 bits, a first quantization table is used. The first quantization table has a narrow quantization range like [−12, −8, −4, −2, −1, 0, 1, 2, 4, 8, 12] in which intervals between differences are small. If only one quantization table is used, when a difference ranging from −63 to +63 is expressed with 3 bits, both differences having small intervals and differences having large intervals should be appropriately used. On the other hand, if different encoding types are determined and pixels having small differences are assigned a quantization range in which differences from their reference pixels have small intervals, a quantization error can be reduced.

When the color components of each of the input I/P pixel pair (or the P/I pixel pair) are each composed of 6 bits, the second pixel encoding unit 1150 encodes the R, G, and B components of the I pixel into 4, 5, and 4 bits and the R, G, and B differences of the P pixel into 4, 4, and 4 bits, thereby generating the first bitstream and the second bitstream. Here, when the R, G, and B differences of the P pixel are encoded into 4, 4, and 4 bits, a second quantization table is used. The second quantization table has a large quantization range like [−56, −48, −40, −32, −28, −24, −16, −8, 0, 8, 16, 24, 28, 32, 40, 48, 56] in which values have large intervals. If the difference of the P pixel is large like in an edge region, an encoding error can be reduced using the second quantization table. If the first quantization table is used for an edge region, the edge region cannot be presented well, causing a large difference between the presentation and the original pixel and thus severe loss in display quality. In other words, when only one quantization table is used, it is difficult to well present both an edge image and a smoothly changing image. However, by using two quantization tables, both a portion having a large difference and a portion having a small difference, i.e., an edge and a general image, can be expressed well, thereby preventing degradation in display quality.

Figure 12:
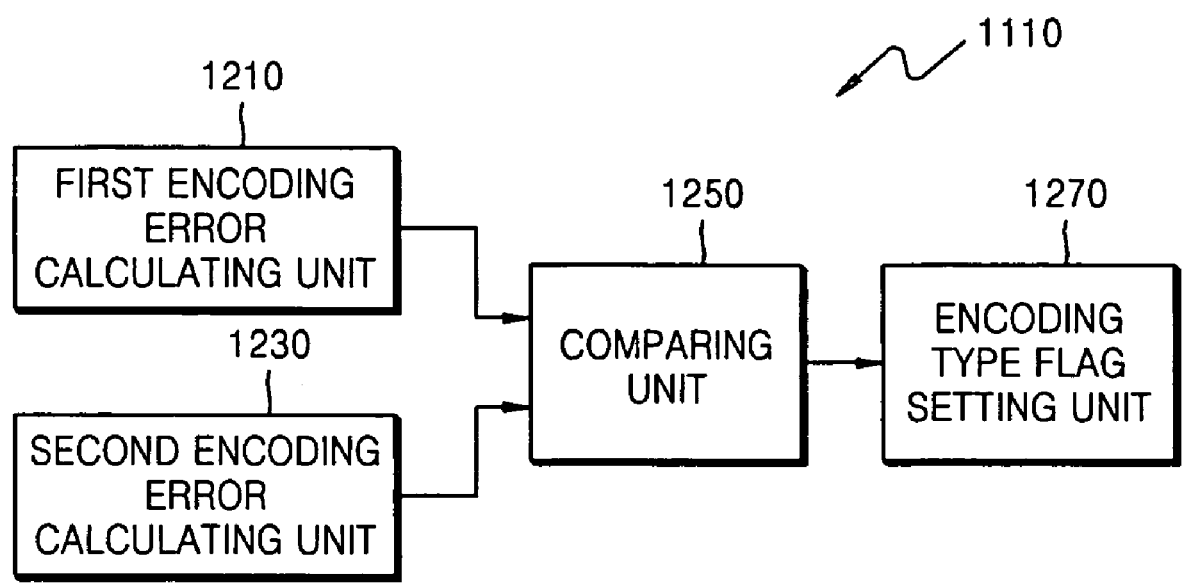
FIG. 12 is a detailed block diagram of an encoding type determining unit of FIG. 11.

FIG. 12 is a detailed block diagram of the encoding type determining unit 1110 of FIG. 11. The encoding type determining unit 1110 includes a first encoding error calculating unit 1210 (first encoding error calculator), a second encoding error calculating unit 1230 (a second encoding error calculator), a comparing unit 1250 (a comparator), and an encoding type flag setting unit 1270 (encoding type flag setter).

Referring to FIG. 12, the first encoding error calculating unit 1210 adds squares of differences between decoded color components of each pixel of the I/P pixel pair (or the I/P pixel pair), obtained by encoding the I/P pixel pair (or the I/P pixel pair) by the first pixel encoding unit 1130 and then performing decoding, and the original color components of each pixel of the I/P pixel pair (or the I/P pixel pair), thereby calculating a first encoding error.

The second error calculating unit 1230 adds squares of differences between decoded color components of each pixel of the I/P pixel pair (or the I/P pixel pair), obtained by encoding the I/P pixel pair (or the I/P pixel pair) by the second pixel encoding unit 1150 and then performing decoding, and the original color components of each pixel of the I/P pixel pair (or the I/P pixel pair), thereby calculating a second encoding error.

The comparing unit 1250 compares the first encoding error calculated by the first encoding error calculating unit 1210 and the second encoding error calculated by the second encoding error calculating unit 1230 and generates an encoding type indication signal indicating a pixel encoding unit that generates the smaller encoding error.

The encoding type flag setting unit 1270 sets an encoding type flag for the input I/P pixel pair (or the P/I pixel pair) according to the encoding type indication signal provided from the comparing unit 1250.

Figure 13:
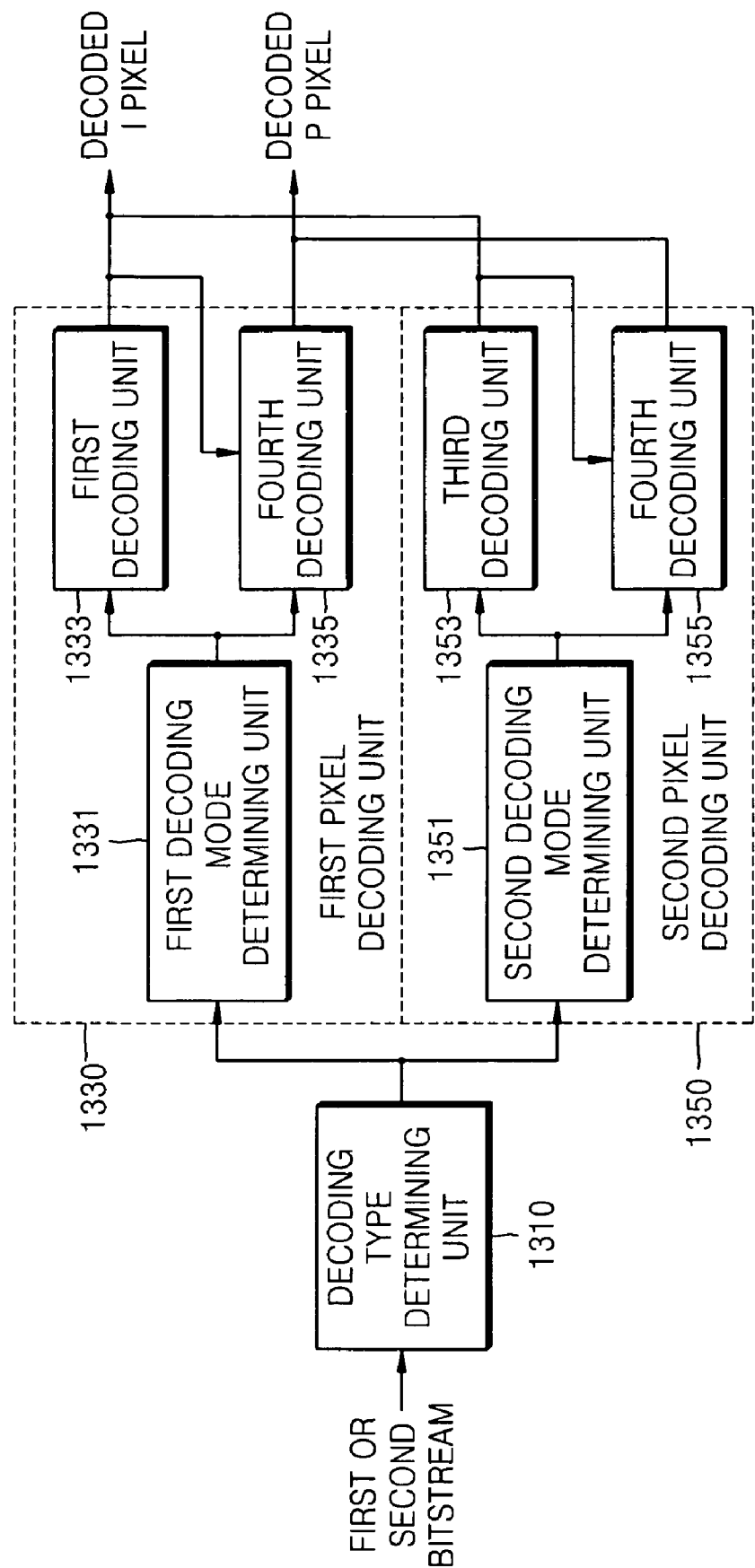
FIG. 13 is a block diagram of an image decoding apparatus according to another exemplary embodiment of the present invention.

FIG. 13 is a block diagram of an image decoding apparatus according to another exemplary embodiment of the present invention. The image decoding apparatus includes a decoding type determining unit 1310 (decoding type determiner), a first pixel decoding unit 1330 (first pixel decoder), and a second pixel decoding unit 1350 (second pixel decoder). The first pixel decoding unit 1330 (first pixel decoder) includes a first decoding mode determining unit 1331 (first decoding mode determiner), a first decoding unit 1333 (first decoder), and a second decoding unit 1335 (second decoder). The second pixel decoding unit 1350 includes a second decoding mode determining unit 1351 (second decoding mode determiner), a third decoding unit 1353 (third decoding mode determiner), and a fourth decoding unit 1355 (fourth decoder).

Referring to FIG. 13, the first pixel decoding unit 1330 and the second pixel decoding unit 1350 correspond to the first pixel encoding unit 1130 and the second pixel encoding unit 1150 and their configurations and operations may be the same as those of FIGS. 9 and 10 or may be changed adaptively according to the forms of desired first and second bitstreams.

Figure 14A:
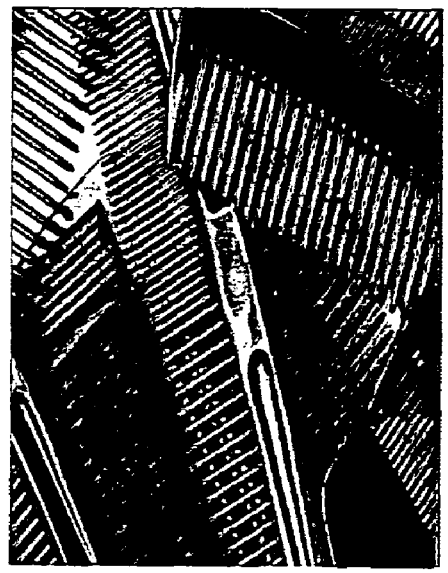
FIGS. 14A and 14B are views for comparing the display quality of an original image having high complexity and the display quality of its reconstructed image according to an exemplary embodiment of the present invention.
Figure 14B:
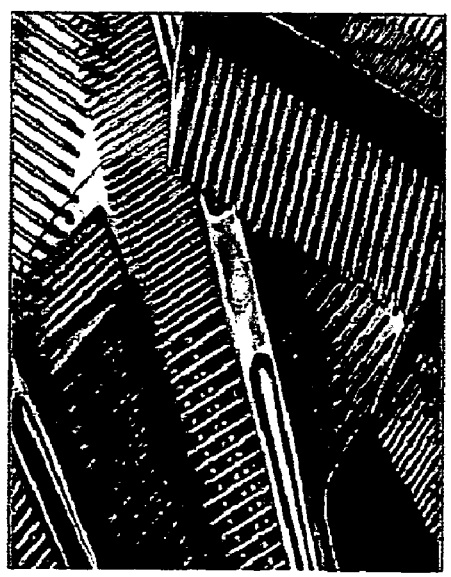

FIGS. 14A and 14B are views for comparing the display quality of an original image having high complexity and the display quality of its reconstructed image according to the present invention. The reconstructed image of FIG. 14B has a peak signal-to-noise ratio (PSNR) of 32.7 dB and has no large visual difference from the original image of FIG. 14A.

Figure 15A:
FIGS. 15A and 15B are views for comparing the display quality of an original image having intermediate complexity and the display quality of its reconstructed image according to the present invention.
Figure 15B:

FIGS. 15A and 15B are views for comparing the display quality of an original image having intermediate complexity and the display quality of its reconstructed image according to the present invention. The reconstructed image of FIG. 15B has a PSNR of 35.2 dB and has no large visual difference from the original image of FIG. 15A.

Figure 16A:
FIGS. 16A and 16B are views for comparing the display quality of an original image having a pattern and the display quality of its reconstructed image according to an exemplary embodiment of the present invention.
Figure 16B:

FIGS. 16A and 16B are views for comparing the display quality of an original image having a pattern and the display quality of its reconstructed image according to the present invention. The reconstructed image of FIG. 16B has a PSNR of 59.89 dB and has no large visual difference from the original image of FIG. 16A.

FIGS. 17A and 17B are views for comparing the display quality of an original image having a text and the display quality of its reconstructed image according to the present invention. The reconstructed image of FIG. 17B has a PSNR of 43.5 dB and has no large visual difference from the original image of FIG. 17A.

The image encoding apparatus and the image decoding apparatus may be included in a driving circuit of a display unit like an LCD panel as being mounted in a multimedia device such as a mobile phone, a PDA, a digital camera, or a notebook computer.

As described above, according to the present invention, in a display driving circuit using compression technology, an image decoding apparatus is constructed with a small number of gates while achieving a desired compression rate without degradation in display quality.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, or DVDS), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or field programmable gate array (FPGA), which may be one or more processors.

In addition, hardware devices may be configured to act as one or more software modules in order to perform the operations of the above-described exemplary embodiments.

The term module generally refers to, but is not limited to, a software or hardware component, such as a Field Programmable Gate Array (FPGA) or an Application Specific Integrated Circuit (ASIC), which performs certain tasks. A module may also advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and the modules can operate at least one processor (e.g. central processing unit (CPU)) provided in a device.

The computer readable code/instructions and computer readable medium/media may be those specially designed and constructed for the purposes of the present invention, or they may be of the kind well-known and available to those skilled in the art of computer hardware and/or computer software.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An image encoding apparatus comprising:
   an encoding mode determiner to determine a first encoding mode and a second encoding mode to be encoding modes of a first pixel and a second pixel that are adjacent to each other and are included in a line;
   a first encoder to encode the first pixel whose encoding mode is determined to be the first encoding mode to generate a first bitstream; and
   a second encoder to encode a difference of the second pixel whose encoding mode is determined to be the second encoding mode from its reference pixel to generate a second bitstream.

2. The image encoding apparatus of claim 1, wherein the first encoder encodes each color component of the first pixel by performing bit-shifting each color component of the first pixel.

3. The image encoding apparatus of claim 2, wherein the first encoder removes the least significant bit of each color component from the first pixel.

4. The image encoding apparatus of claim 2, wherein the first encoder adds a bit removed by bit-shifting to one of encoded color components of the first pixel.

5. The image encoding apparatus of claim 4, wherein the one of the encoded color components is a G component.

6. The image encoding apparatus of claim 4, wherein if R, G, and B differences between the second pixel adjacent to the first pixel and the reference pixel are the same as one another, the one of the encoded color components is determined by sequentially checking encoding results of G, R, and B components of the first pixel.

7. The image encoding apparatus of claim 4, wherein if R, G, and B differences between the second pixel adjacent to the first pixel and the reference pixel are different from one another, the one of the encoded color components is determined by the encoding results of the R, G, and B components of the first pixel.

8. The image encoding apparatus of claim 1, wherein the second encoder comprises:
   a difference calculator to calculate a difference of the current second pixel from its adjacent first pixel that is determined to be the reference pixel;
   a quantization range adjuster to adjust a quantization range used for quantization of R, G, and B differences of the current second pixel in a quantization table according to the adjacent first pixel determined to be the reference pixel; and
   a quantizer to quantize the difference of the current second pixel to generate a quantization index according to the adjusted quantization range.

9. The image encoding apparatus of claim 8, wherein the second encoder further comprises a reference pixel determiner that compares a first difference between the current second pixel and its previous first pixel with a second difference between the current second pixel and its following first pixel and determines the first pixel in a direction having a smaller difference from the second pixel to be the reference pixel.

10. The image encoding apparatus of claim 8, wherein the quantization range adjuster adjusts the quantization range in such a way to include more positive numbers when there is a high possibility that the difference of the second pixel is a positive number.

11. The image encoding apparatus of claim 8, wherein the quantization range adjuster adjusts the quantization range in such a way to include more negative numbers when there is a high possibility that the difference of the second pixel is a negative number.

12. An image encoding method comprising:
   determining, using at least one processor, a first encoding mode and a second encoding mode to be encoding modes of a first pixel and a second pixel that are adjacent to each other and are included in a line;
   encoding the first pixel whose encoding mode is determined to be the first encoding mode to generate a first bitstream; and
   encoding a difference of the second pixel whose encoding mode is determined to be the second encoding mode from its reference pixel to generate a second bitstream.

13. The image encoding method of claim 12, wherein the generation of the first bitstream comprises encoding each color component of the first pixel by performing bit-shifting each color component of the first pixel.

14. The image encoding method of claim 13, wherein the generation of the first bitstream comprises removing the least significant bit of each color component from the first pixel.

15. The image encoding method of claim 12, wherein the generation of the second bitstream comprises:
   calculating a difference of the current second pixel from its adjacent first pixel that is determined to be the reference pixel;
   adjusting a quantization range used for quantization of R, G, and B differences of the current second pixel in a quantization table according to the adjacent first pixel determined to be the reference pixel; and
   quantizing the difference of the current second pixel to generate a quantization index according to the adjusted quantization range.

16. The image encoding method of claim 15, wherein the generation of the second bitstream further comprises comparing a first difference between the current second pixel and its previous first pixel with a second difference between the current second pixel and its following first pixel and determining the first pixel in a direction having a smaller difference from the second pixel to be the reference pixel.

17. The image encoding method of claim 15, wherein the adjustment of the quantization range comprises adjusting the quantization range in such a way to include more positive numbers when there is a high possibility that the difference of the second pixel is a positive number.

18. The image encoding method of claim 15, wherein the adjustment of the quantization range comprises adjusting the quantization range in such a way to include more negative numbers when there is a high possibility that the difference of the second pixel is a negative number.

19. The image encoding method of claim 12, wherein when R, G, and B components of each of the first pixel and the second pixel are each composed of 6 bits, the generation of the first bitstream comprises encoding each of the R, G, and B components of the first pixel into 5 bits and adding one bit corresponding to the difference of the second pixel to one of the R, G, and B components of the first pixel.

20. The image encoding method of claim 19, wherein when R, G, and B components of each of the first pixel and the second pixel are each composed of 6 bits, the generation of the second bitstream comprises encoding the R, G, and B components of the second pixel into 3, 4, and 3 bits and assigning one bit as a direction flag of the reference pixel used to obtain the difference of the second pixel.

21. At least one non-transitory medium comprising computer readable instructions that control at least one processor to implement the method of claim 12.

22. An image decoding apparatus comprising:
   a decoding mode determiner to receive a first bitstream and a second bitstream that are obtained by encoding a first pixel and a second pixel in different encoding modes and to determine a decoding mode;
   a first decoder to generate a decoded first pixel by decoding the first bitstream if the decoding mode is a first decoding mode; and
   a second decoder to generate a decoded second pixel by decoding the second bitstream using a quantization index and to add the decoding result of a reference pixel to the decoding result of the second bitstream if the decoding mode is a second decoding mode.

23. An image decoding method comprising:
   receiving a first bitstream and a second bitstream that are obtained by encoding a first pixel and a second pixel in different encoding modes and determining a decoding mode;
   generating a decoded first pixel by decoding the first bitstream if the decoding mode is a first decoding mode; and
   generating, using at least one processor, a decoded second pixel by decoding the second bitstream using a quantization index and adding the decoding result of a reference pixel to the decoding result of the second bitstream if the decoding mode is a second decoding mode.

24. At least one non-transitory medium comprising computer readable instructions that control at least one processor to implement the method of claim 23.

25. A display driving circuit comprising:
   an image encoder to generate a first bitstream by encoding a first pixel of a line and generating a second bitstream by encoding a difference of a second pixel adjacent to the first pixel from its reference pixel;
   a main memory to store a bitstream generated by the image encoding unit;

a write controller to control a write operation of the bitstream generated by the image encoding unit to the main memory;

a read controller to control a read operation of the bitstream stored in the main memory; and an image decoder to decode the first bitstream corresponding to the first pixel and the second bitstream corresponding to the second pixel among a bitstream corresponding to one line read from the main memory under the control of the read controller in decoding modes corresponding to encoding modes to generate a decoded first pixel and a decoded second pixel and to reconstruct image data to be displayed on a display unit.

26. A display driving method comprising:

generating a first bitstream by encoding a first pixel of a line, generating a second bitstream by encoding a difference of a second pixel adjacent to the first pixel from its reference pixel, and storing a generated bitstream in a main memory; and decoding, using at least one processing device, the first bitstream corresponding to the first pixel and the second bitstream corresponding to the second pixel among a bitstream corresponding to one line read from the main memory under the control of the read control unit in decoding modes corresponding to encoding modes to generate a decoded first pixel and a decoded second pixel and to reconstruct image data to be displayed on a display unit.

27. At least one non-transitory medium comprising computer readable instructions that control at least one processor to implement the method of claim 26.

28. An image encoding apparatus comprising:

an encoding type determiner to determine an encoding type by comparing a first encoding error, obtained by encoding an I/P pixel pair through a first pixel encoding process and then performing decoding, with a second encoding error, obtained by encoding the I/P pixel pair through a second encoding process and then performing decoding;

a first pixel encoder to encode the I/P pixel pair in different encoding modes based on a determined first encoding type; and a second pixel encoder to encode the I/P pixel pair in different encoding modes based on a determined second encoding type.

29. The image encoding apparatus of claim 28, wherein if R, G, and B components of each pixel of the I/P pixel pair are each composed of 6 bits, the first pixel encoder encodes the R, G, and B components of the I pixel into 5, 6, and 5 bits, encodes R, G, and B differences of the P pixel into 3, 3, and 3 bits, and adds one bit indicating the determined encoding type.

30. The image encoding apparatus of claim 28, wherein if R, G, and B components of each pixel of the I/P pixel pair are each composed of 6 bits, the first pixel encoder encodes the R, G, and B components of the I pixel into 4, 5, and 4 bits, encodes R, G, and B differences of the P pixel into 4, 4, and 4 bits, and adds one bit indicating the determined encoding type.

31. The image encoding apparatus of claim 28, wherein the first pixel encoder and the second pixel encoder use different quantization tables.

32. An image decoding apparatus comprising:

a decoding type determiner to receive a bitstream of an I/P pixel pair and to determine a decoding type from an encoding type included in the bitstream;

a first pixel decoder to decode the bitstream of the I/P pixel pair in different decoding modes based on a determined first decoding type; and a second pixel decoder to decode the bitstream of the I/P pixel pair in different decoding modes based on a determined second pixel decoding type.

33. An image decoding method comprising:

receiving a bitstream of an I/P pixel pair and determining a decoding type from an encoding type included in the bitstream;

decoding the bitstream of the I/P pixel pair in different decoding modes based on a determined first decoding type; and decoding, using at least one processor, the bitstream of the I/P pixel pair in different decoding modes based on a determined second pixel decoding type.

34. At least one non-transitory medium comprising computer readable instructions that control at least one processor to implement the method of claim 33.

35. An image encoding method comprising:

determining, using at least one processor, an encoding type by comparing a first encoding error, obtained by encoding an I/P pixel pair through a first pixel encoding process and then performing decoding, with a second encoding error, obtained by encoding the I/P pixel pair through a second encoding process and then performing decoding;

encoding the I/P pixel pair in different encoding modes based on a determined first encoding type; and encoding the I/P pixel pair in different encoding modes based on a determined second encoding type.

36. At least one non-transitory medium comprising computer readable instructions that control at least one processor to implement the method of claim 35.

* * * * *